(12) United States Patent
Abramson et al.

(10) Patent No.: US 12,546,724 B2
(45) Date of Patent: Feb. 10, 2026

(54) COUPLING MIRROR OF AN OPTICAL INSPECTION SYSTEM

(71) Applicant: Applied Materials Israel Ltd., Rehovot (IL)

(72) Inventors: Mariano Abramson, Jerusalem (IL); Uzi Barazani, Rehovot (IL); Menachem Lapid, Hashmonaim (IL)

(73) Assignee: Applied Materials Israel Ltd., Rehovot (IL)

( * ) Notice: Subject to any disclaimer, the term of this patent is extended or adjusted under 35 U.S.C. 154(b) by 177 days.

(21) Appl. No.: 18/104,231

(22) Filed: Jan. 31, 2023

(65) Prior Publication Data

US 2024/0255436 A1  Aug. 1, 2024

(51) Int. Cl.
*G01N 21/88* (2006.01)
*G01N 21/95* (2006.01)
(Continued)

(52) U.S. Cl.
CPC ..... *G01N 21/8806* (2013.01); *G01N 21/9501* (2013.01); *G02B 21/02* (2013.01);
(Continued)

(58) Field of Classification Search
CPC .......... G01N 21/8806; G01N 21/9501; G01N 2201/0636; G01N 2201/121; G01N 2021/8825; G01N 2021/8845; G02B 21/02; G02B 21/125; G02B 21/18; G02B 27/0012; G02B 21/10; H01L 22/12
(Continued)

(56) References Cited

U.S. PATENT DOCUMENTS

| 2013/0148114 A1* | 6/2013 | Berlatzky | G01N 21/4788 356/237.5 |
| 2014/0354983 A1* | 12/2014 | Kolchin | G01N 21/9501 356/237.1 |

\* cited by examiner

*Primary Examiner* — Tri T Ton
(74) *Attorney, Agent, or Firm* — Lowenstein Sandler LLP

(57) ABSTRACT

A wafer inspection tool comprising an illumination system having: a field of view (FOV); a light source pupil having a size and shape; a central optical axis; and one or more field angle defining a shape of said FOV extending away from said light source pupil; an objective lens arrangement including an objective and a plurality of interchangeable telescopes coupled thereto, the objective lens arrangement being configured to collect light reflected off a plurality of field points on the wafer and to onwardly transmit a light beam formed from the collected light; and a light separator having a first reflective surface with a transmissive region formed therein and a second surface, wherein said transmissive region is arranged to allow therethrough a central portion of said light beam transmitted from said objective lens arrangement corresponding to the brightfield channel while said reflective surface is arranged to reflect a peripheral portion of said light beam transmitted from said objective lens arrangement corresponding to the darkfield channel; a relay module configured to relay said light source pupil to said transmissive region; wherein said transmissive region has a shape defined as a geometric intersection volume between a model of said illumination light and said reflective surface and said second surface; wherein said model includes a plurality of solids each solid having a cross section of said light source pupil and angled to a field angle of said one or more field angle.

18 Claims, 11 Drawing Sheets

(51) Int. Cl.
*G02B 21/02* (2006.01)
*G02B 21/12* (2006.01)
*G02B 21/18* (2006.01)
*G02B 27/00* (2006.01)

(52) U.S. Cl.
CPC ........... *G02B 21/125* (2013.01); *G02B 21/18* (2013.01); *G02B 27/0012* (2013.01); *G01N 2201/0636* (2013.01); *G01N 2201/121* (2013.01)

(58) Field of Classification Search
USPC ................. 356/237.1–237.6, 239.1–239.8
See application file for complete search history.

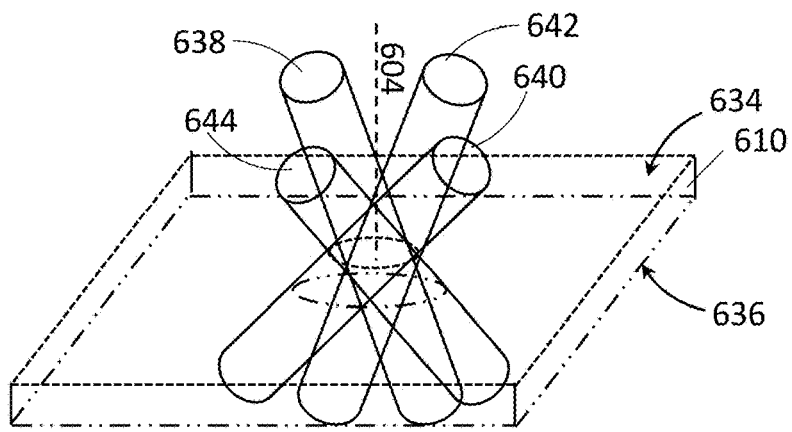
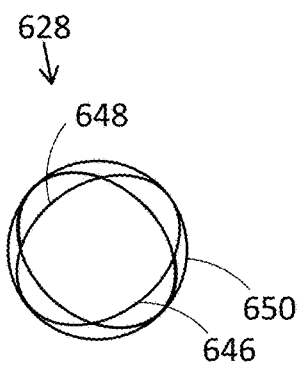
FIG. 6A
FIG. 6B
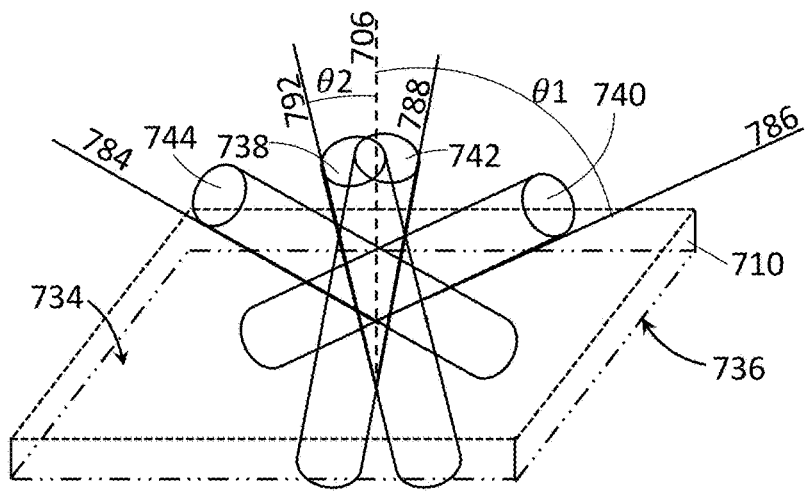
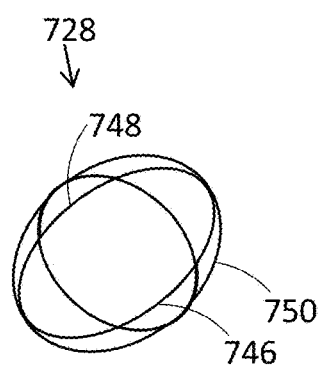
FIG. 7A
FIG. 7B
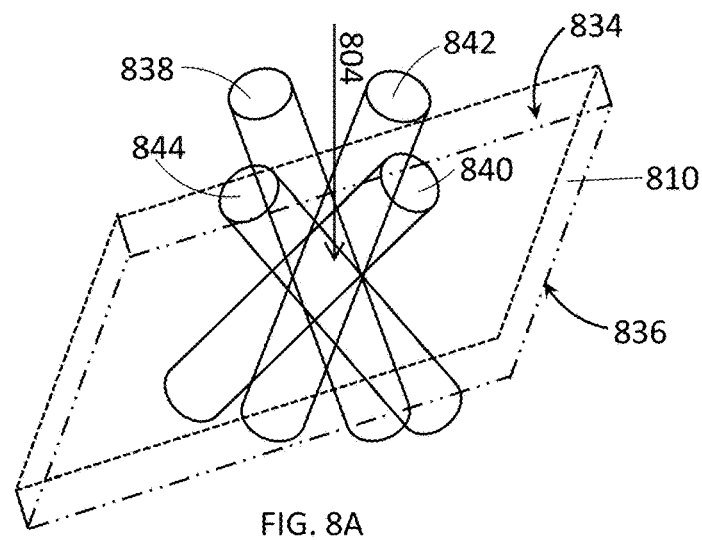
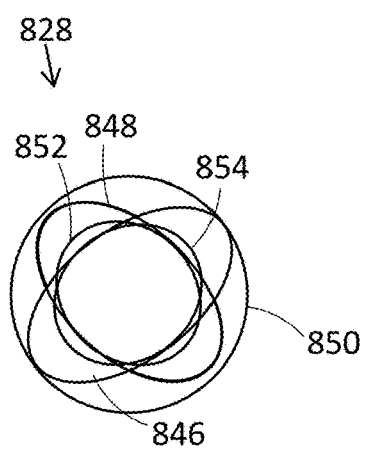
FIG. 8A
FIG. 8B

COUPLING MIRROR OF AN OPTICAL INSPECTION SYSTEM

TECHNOLOGICAL FIELD

The present disclosure, in some embodiments, thereof, relates to an optical inspection system and, more particularly, but not exclusively, to a coupling mirror of the optical inspection system.

BACKGROUND ART

Acknowledgement of the above references herein is not to be inferred as meaning that these are in any way relevant to the patentability of the presently disclosed subject matter.

GENERAL DESCRIPTION

Following is a non-exclusive list of some exemplary embodiments of the disclosure. The present disclosure also includes embodiments which include fewer than all the features in an example and embodiments using features from multiple examples, even if not listed below.

Example 1. A wafer inspection tool including an optical reflective microscope system configured to provide a brightfield channel and a darkfield channel, comprising:
- an illumination system providing ultraviolet illumination light with wavelengths below 300 nm and having:
    - a field of view (FOV);
    - a light source pupil having a size and shape;
    - a central optical axis; and
        - one or more field angle defining a shape of said FOV extending away from said light source pupil;
- an objective lens arrangement including an objective and a plurality of interchangeable telescopes coupled thereto to control a magnification and a numerical aperture of said optical reflective microscope, the objective lens arrangement being configured to collect light reflected off a plurality of field points on the wafer and to onwardly transmit a light beam formed from the collected light; and
- a light separator having a first reflective surface with a transmissive region formed therein and a second surface, wherein said transmissive region is arranged to allow therethrough a central portion of said light beam transmitted from said objective lens arrangement corresponding to the brightfield channel while said reflective surface is arranged to reflect a peripheral portion of said light beam transmitted from said objective lens arrangement corresponding to the darkfield channel;
- a relay module configured to relay said light source pupil to said transmissive region;
- wherein said transmissive region has a shape defined as a geometric intersection volume between a model of said illumination light and said reflective surface and said second surface;
- wherein said model includes a plurality of solids each solid having a cross section of said light source pupil and angled to a field angle of said one or more field angle.

Example 2. The wafer inspection tool according to Example 1, wherein transmissive region is enlarged from said geometric intersection volume, enlargement based on one or more tolerance.

Example 3. The wafer inspection tool according to Example 2, wherein said one or more tolerance includes an error in positioning of said light source pupil at said transmissive region by said relay module.

Example 4. The wafer inspection tool according to Example 3, wherein said one or more tolerance comprises a relay module magnification error.

Example 5. The wafer inspection tool according to any one of Examples 3-4, wherein said one or more tolerance comprises a relay module centricity error.

Example 6. The wafer inspection tool according to any one of Examples 3-5, wherein said one or more tolerance comprises an error in said size and/or shape of said light source pupil.

Example 7. The wafer inspection tool according to any one of Examples 2-6, wherein said one or more tolerance comprises one or more error associated with positioning of said interchangeable telescopes.

Example 8. The wafer inspection tool according to any one of Examples 2-7, wherein said one or more error comprises an error in said one or more field angle.

Example 9. The wafer inspection tool according to any one of Examples 2-8, wherein said one or more tolerance comprises error in light separator geometry and/or position.

Example 10. The wafer inspection tool according to any one of Examples 2-9, wherein said one or more tolerance comprises error in centering of said separator to said illumination light.

Example 11. The wafer inspection tool according to any one of Examples 2-10, wherein said one or more tolerance comprises error in relay of said light source pupil associated with aberration in said relay module.

Example 12. The wafer inspection tool according to any one of Examples 1-11, wherein said reflective surface and second surface are parallel surfaces.

Example 13. The wafer inspection tool according to any one of Examples 1-12, wherein said transmissive region includes a hole in said light separator.

Example 14. The wafer inspection tool according to any one of Examples 1-13, wherein said transmissive region includes at least partially transparent material.

Example 15. The wafer inspection tool according to any one of Examples 1-14, wherein said illumination system is configured to provide a plurality of illumination FOVs having different light source pupils;
- wherein said light separator comprises a plurality of said transmissive regions, each transmissive region corresponding to a light source pupil of a FOV of said plurality of illumination FOVs.

Example 16. The wafer inspection tool according to Example 15, wherein said different light source pupils have different shapes, said plurality of said transmissive regions having corresponding different shapes.

Example 17. An optical inspection system comprising:
- a light source module producing illumination light having a field of view (FOV) comprising:
    - a light source pupil;
    - a central optical axis;
    - a cross-sectional shape perpendicular to said central optical axis; and
        - one or more field angle defining a shape of the illumination extending away from said light source pupil;
- a light separator occupying a space between a first light separator plane and a second light separator plane said first light separator plane and said second light separator planes at an angle to said central optical axis and having a transfer portion which allows passage therethrough of said illumination light; and a relay module configured to relay said light source pupil to said transfer portion;

wherein said transfer portion has a shape defined as a geometric intersection volume between a model of said illumination light and a space between said first light separator plane and said second light separator plane;

wherein said model includes a plurality of solids each solid having a cross section of said light source pupil and angled to a field angle of said one or more field angle.

Example 18. The system according to Example 17, wherein said transfer portion is enlarged from said geometric intersection volume, enlargement based on one or more tolerance.

Example 19. The system according to any one of Examples 17-18, wherein said light separator comprises an element having a reflective surface on at least a portion of said first light separator plane; and wherein said transfer portion is a transmissive portion of said light separator.

Example 20. The system according to Examples 17-18, wherein said transfer portion includes a hole passing through material of said light separator.

Example 21. A method of design of a shape of a transfer portion in a separator of an optical inspection system comprising:

receiving illumination parameters including:
a shape of a light source pupil through which system illumination is passed; and
one or more field angle defining a shape of the illumination extending away from said light source pupil;
receiving separator parameters including geometry of a first separator surface and a second separator surface with respect to said illumination parameters;
modeling system illumination as a plurality of solid volumes each solid volume having a cross section of said light source pupil and angled to a field angle of said one or more field angle; and
determining said transfer portion shape as a geometric intersection volume between said plurality of solid volumes and said separator as defined between said first separator surface and said second separator surface.

Example 22. The method according to Example 21, wherein said determining comprises enlarging said transfer portion from said geometric intersection volume based on one or more tolerance.

Example 23. A method of designing an optical inspection system, which system including a light source configured to produce light having a field of view for inspection of a substrate, which light passing through a separator element and an objective before reaching said substrate, which method comprising:

receiving one or more illumination parameters;
receiving one or more separator element parameters;
receiving a range of allowable pupil distances between said separator element and said objective;
receiving a range of allowed illumination field of view (FOV) offsets;
receiving an allowed ranged of substrate positions;
determining an allowed range of separator element orientations, based on said one or more separator element parameters and said range of allowable pupil distances;
determining one or more optimum system parameter including one or more of:
a separator element orientation;
an illumination direction;
a substrate position; and
a mirror element transmissive regions shape.

Example 24. The method according to Example 21, wherein said determining comprises determining based on one or more tolerance.

Unless otherwise defined, all technical and/or scientific terms used within this document have meaning as commonly understood by one of ordinary skill in the art/s to which the present disclosure pertains. Methods and/or materials similar or equivalent to those described herein can be used in the practice and/or testing of embodiments of the present disclosure, and exemplary methods and/or materials are described below.

Regarding exemplary embodiments described below, the materials, methods, and examples are illustrative and are not intended to be necessarily limiting.

Some embodiments of the present disclosure are embodied as a system, method, or computer program product. For example, some embodiments of the present disclosure may take the form of an entirely hardware embodiment, an entirely software embodiment (including firmware, resident software, micro code, etc.) or an embodiment combining software and hardware aspects that may all generally be referred to herein as a "circuit," "module" and/or "system."

Implementation of the method and/or system of some embodiments of the present disclosure can involve performing and/or completing selected tasks manually, automatically, or a combination thereof. According to actual instrumentation and/or equipment of some embodiments of the method and/or system of the present disclosure, several selected tasks could be implemented by hardware, by software or by firmware and/or by a combination thereof, e.g., using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computational device e.g., using any suitable operating system.

In some embodiments, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage e.g., for storing instructions and/or data. Optionally, a network connection is provided as well. User interface/s e.g., display/s and/or user input device/s are optionally provided.

Some embodiments of the present disclosure may be described below with reference to flowchart illustrations and/or block diagrams. For example illustrating exemplary methods and/or apparatus (systems) and/or and computer program products according to embodiments of the present disclosure. It will be understood that each step of the flowchart illustrations and/or block of the block diagrams, and/or combinations of steps in the flowchart illustrations and/or blocks in the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart steps and/or block diagram block or blocks.

These computer program instructions may also be stored in a computer readable medium that can direct a computer (e.g., in a memory, local and/or hosted at the cloud), other programmable data processing apparatus, or other devices to function in a particular manner, such that the instructions stored in the computer readable medium can be used to produce an article of manufacture including instructions which implement the function/act specified in the flowchart and/or block diagram block or blocks.

The computer program instructions may also be run by one or more computational device to cause a series of operational steps to be performed e.g., on the computational device, other programmable apparatus and/or other devices to produce a computer implemented process such that the instructions which execute provide processes for implementing the functions/acts specified in the flowchart and/or block diagram block or blocks.

Some of the methods described herein are generally designed only for use by a computer, and may not be feasible and/or practical for performing purely manually, by a human expert. A human expert who wanted to manually perform similar tasks, might be expected to use different methods, e.g., making use of expert knowledge and/or the pattern recognition capabilities of the human brain, potentially more efficient than manually going through the steps of the methods described herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 6A is a simplified schematic illustrating modelling of illumination light as it interacts with a coupling mirror, according to some embodiments of the disclosure;

FIG. 6B illustrates a shape at a surface plane of a coupling mirror, according to some embodiments of the disclosure;

FIG. 7A is a simplified schematic illustrating modelling of illumination light as it interacts with a coupling mirror, according to some embodiments of the disclosure;

FIG. 7B illustrates a shape at a surface plane of a coupling mirror, according to some embodiments of the disclosure;

FIG. 8A is a simplified schematic illustrating modelling of illumination light as it interacts with a coupling mirror, according to some embodiments of the disclosure;

FIG. 8B illustrates a shape at a surface plane of a coupling mirror, according to some embodiments of the disclosure;

In some embodiments, although non-limiting, in different figures, like numerals are used to refer to like elements, for example, element 110 in FIG. 1 corresponding to element 210 in FIG. 2.

DETAILED DESCRIPTION OF EMBODIMENTS

Figure 1A:
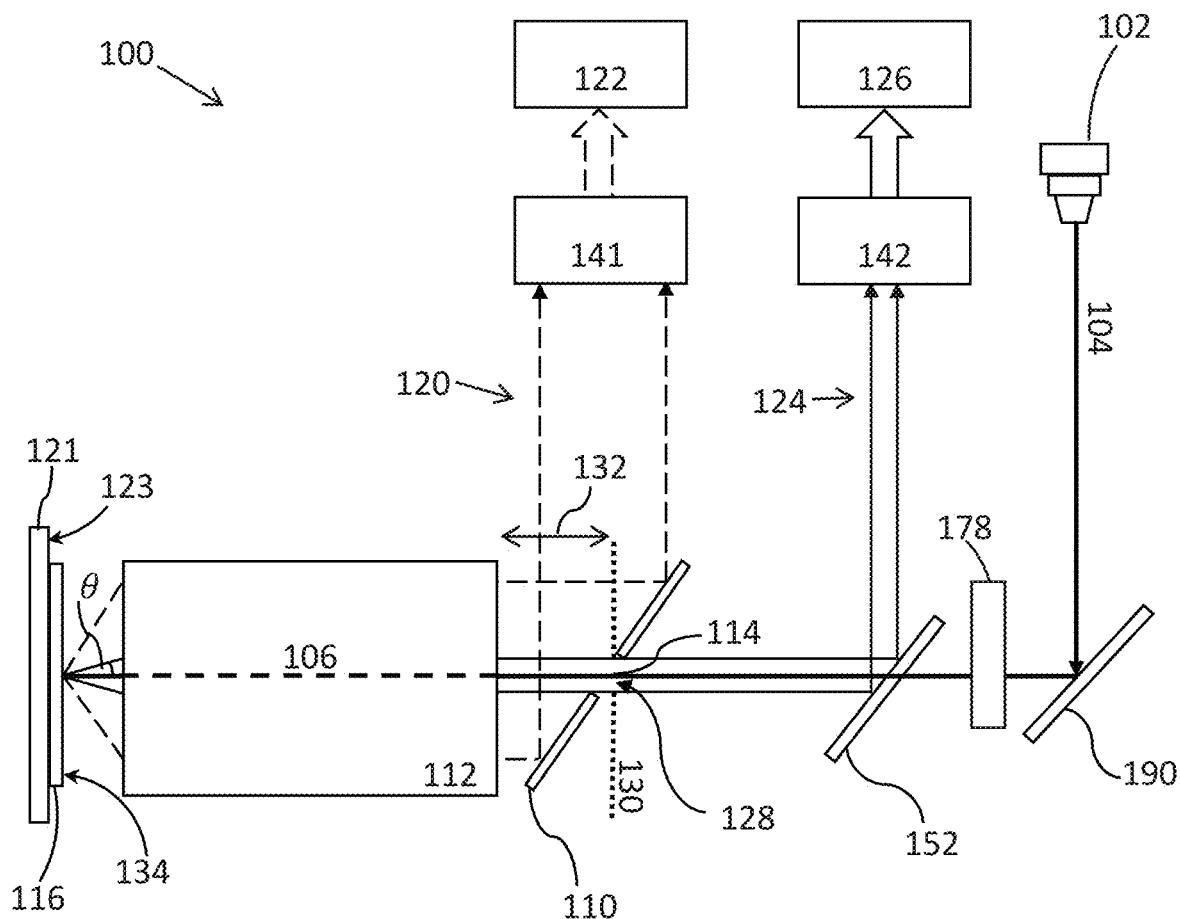
FIG. 1A is a simplified schematic of an inspection system 100 according to some embodiments of the disclosure.

The present disclosure, in some embodiments, thereof, relates to an optical inspection system and, more particularly, but not exclusively, to a coupling mirror of the optical inspection system.

Overview

A broad aspect of some embodiments of the disclosure relates to minimizing a size of a transmissive region in a light separator of an optical inspection system so that the transmissive region best fits illumination light for inspection of an object. Where the light separator separates brightfield and darkfield light signals of light reflected from the object. A potential benefit of minimizing the transmissive region size being a potentially increased amount of dark field light being directed towards a dark field detector by the separator.

In some embodiments, the separator includes an element having a reflective surface and a transmissive region, where the reflective surface directs dark field light and where the transmissive region allows passage therethrough of illumination light and bright field reflected light.

An aspect of some embodiments of the disclosure relates to designing the transmissive region (also herein termed "window") shape by determining a volume of overlap (neglecting effect of the separator on the light) between source illumination light of the inspection system and the separator (also herein termed "coupling mirror"). The determining, in some embodiments, assuming that the illumination light pupil is relayed to the coupling mirror.

Referring now to an exemplary system where beams of illumination light are directed to different portions of a field of view (FOV) to scan an object to be inspected. Each beam of illumination light, in some embodiments, has a cross section corresponding to the illumination source entrance pupil and travels at an angle which corresponds to a field point on the object to be inspected. In some embodiments, the most highly angled beams e.g. corresponding to edges of the illumination FOV and/or edges of an inspection FOV are used to determine the overlap volume.

Referring now to an exemplary system with aerial illumination, marginal rays of the illumination correspond to edges of the illumination FOV and/or edges of the inspection FOV. Where, in some embodiments, the overlap volume is determined using the overlap volume of the mirror with solid shapes having cross section of the illumination source pupil and positioned with their edges following marginal rays of the illumination. Where, the solid shapes, in some embodiments, correspond with the most highly angled beams of the exemplary scanning light system.

In some embodiments, the window in the coupling mirror is designed by enlarging the overlap volume e.g. to account for error/s in the system and/or non-ideal nature of components. Where, in an exemplary embodiment, the overlap volume is enlarged uniformly by a determined value.

In some embodiments, enlargement is according to an error in relay of the light source pupil to the coupling mirror. Where, for example, the pupil is positioned at the coupling mirror to an accuracy provided by a relay module relaying the illumination pupil to the coupling mirror. Where, in some embodiments, error in relaying of the light source pupil is associated with optical aberration/s in element/s of the relay module.

A broad aspect of some embodiments of the disclosure relates to optimizing of position of one or more system portion and a shape of a window in a coupling mirror. Where, in some embodiments, one or more of an angle of the coupling mirror, a direction of illumination, a substrate position, and the window shape are selected to provide maximal passage of illumination light through the separator and/or maximal directing of light reflected from the substrate to a dark field detector.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary System

FIG. 1A is a simplified schematic of an inspection system 100 according to some embodiments of the disclosure.

Figure 1B:
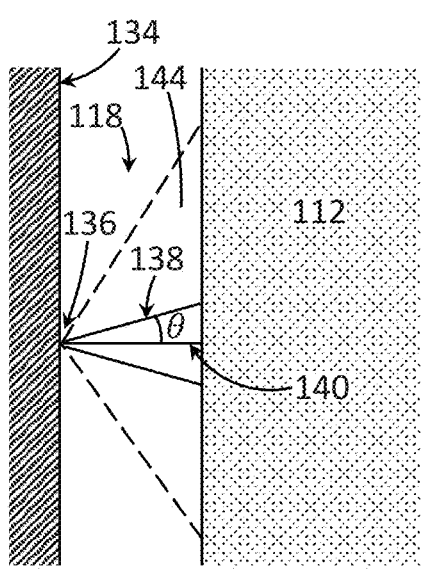
FIG. 1B is a simplified schematic of a portion of an inspection system according to some embodiments of the disclosure.

FIG. 1B is a simplified schematic of a portion of an inspection system according to some embodiments of the disclosure.

In some embodiments, inspection system 100 is a semiconductor wafer and/or mask inspection system, for example, used to inspect one or more of defects, particles, and patterns on a surface e.g. a surface of an object and/or specimen for inspection (hereinafter termed "object", also termed "substrate") 116 e.g. as part of a quality assurance process in semiconductor manufacturing processes.

Inspection system 100, in some embodiments, includes a platform 120 for receiving and/or securing object 116. Platform 121, in some embodiments, is stationary or, in some embodiments, is a moveable stage. For example, in some embodiments, platform 121 includes a stage mechanism (not illustrated) configured to move platform 121 in a longitudinal direction (along and/or in a same direction as an optical axis 106 of an objective lens arrangement 112 which is described hereinbelow) and/or in a transverse direction (x- and/or y-axis of FIG. 1) e.g. in the same plane as platform 121 top surface 123.

In some embodiments, inspection system 100 includes a light source 102 for illuminating object 116.

In some embodiments, light source 102 is a single point source (e.g. a laser) that illuminates a single point on the object.

In some embodiments, a stage mechanism (not illustrated) is configured to move in coordination with scanning sequence for light source 102 e.g. to enable object 116 placed on platform 121 to be scanned by the light source 102.

In some embodiments, light source 102 includes an array of point sources that illuminates multiple points on the object simultaneously (e.g. to make system 100 capable of collecting information from multiple locations on the object simultaneously).

In some embodiments, light source 102 includes an aerial illumination source which illuminates a continuous area.

FIG. 1A illustrates illumination light 104 provided by illumination source 102 as a single ray. In some embodiments, at least a portion of light 104 provided by light source 102 arrives to illuminate object 116.

Optionally, in some embodiments, system 100 includes one or more reflector. For example, a reflector 190 positioned along optical axis 106 of the objective lens arrangement 112 (also herein termed "objective" and/or "objective module") to direct a light beam or multiple light beams from the light source 102 (through the objective lens arrangement 112, described hereinbelow) towards the platform 121. Reflector 190, in some embodiments, enabling light source 102 to be placed off optical axis 106 of the objective lens arrangement 112, for example, to reduce a size of system 100.

Referring now to FIG. 1B which, in some embodiments, is a magnified view of a portion of FIG. 1A, illustrating illumination light 118 reflected off a point 136 on object 116. Where, in some embodiments, light 118 is regarded as forming a cone 138 originating from point 136 with a chief ray or a centroid ray perpendicular to the surface of the object being a central axis 140 of cone 138.

In some embodiments, such a light cone 138 is characterized by a half angle θ defined with respect to central axis 140. In some embodiments, light within cone 138 is considered to be bright field (BF) light. Where, in the BF light signal, in some embodiments, uneven features of surface 134 of the object appear as dark features against a light background.

In some embodiments, light outside of cone 138, i.e. coming off point 136 at an angle greater than θ with respect to chief ray 140, is regarded as scattered light also herein termed dark field (DF) light which does not contain BF light or specular rays. Where, for example, DF light includes light scattered by uneven features, e.g. such as defects and/or particles, e.g. on the surface 134 of object 116.

Referring back now to FIG. 1A, in some embodiments, to separate a DF light signal 120 from a BF light signal 124 (e.g. for separate detection thereof by detector apparatuses 122, 126) system 100 includes a light signal separator/divider 110 (also herein termed "coupling mirror", "coupling element", "mirror element").

Where separator 110, in some embodiments, allows passage of BF light signal 124 therethrough to a BF detector apparatus 126 and directs DF light signal 120 to a DF detector apparatus 122.

Light signal separator 110, in some embodiments, allowing therethrough a central portion of a light beam 118 from objective lens arrangement 112, which comprises light 138 reflected off the surface of the object within the angle θ, while a peripheral portion of the light beam 144, which comprises light scattered off at an angle greater than θ, is collected and reflected in a different direction by a reflective surface of light signal separator 110.

In some embodiments, inspection system 100 includes two imaging lenses or imaging lens arrangements 141, which are hereinafter termed "imaging lens arrangement", where this term should be understood to include an imaging lens as well as an imaging lens arrangement.

In some embodiments, system 100 includes two light detectors apparatuses 122, 126, each of which are respectively disposed behind an imaging lens arrangement of imaging lens arrangements 141, 142. Where, in some embodiments, detector apparatuses 122, 126 each detect an image formed by the respective imaging lens arrangements 141, 142. In some embodiments, detector arrays 122, 126 each include an optical detector e.g. including a camera and/or a detector array.

In some embodiments, each imaging lens arrangement 141, 142 and its corresponding light detector apparatus 122, 126, are arranged to detect a different portion of the light reflected from object 116 (e.g. and collected by the objective lens arrangement 112 e.g. as described hereinbelow). Light signal separator/divider 110, in some embodiments includes (e.g. is provided in the form of) a mirror/reflector (e.g. a plane mirror) having formed therein an opening or transmissive region 128 (e.g. including an uncoated region of the mirror/reflector e.g. including a hole). Where, in some embodiments, transmissive region 128 (also herein termed "window 128") is positioned in a central region of mirror 110.

In some embodiments, (e.g. as illustrated in FIG. 1A) light signal separator/divider 110 is disposed at an angle (i.e. tilted) with respect to optical axis 106 of the objective lens arrangement 112. For example, such that the peripheral portion 144 of the light (DF signal) is directed off the illumination optical axis 106, for example, enabling imaging lens arrangement 141 and DF detector apparatus 122 to be arranged off the optical axis.

Imaging lens arrangement 142 and corresponding detector apparatus 126, in some embodiment are arranged off optical axis 106 of the objective lens arrangement 112 e.g. through the use of e.g. a partially reflective element 152 that is transmissive on one side to allow transmission of light from the light source 102 while reflective on the opposite side to reflect BF signal 124 towards the BF detectors array 126.

It should be understood that illustrated positioning the imaging lens arrangements 141, 142 and/or detector apparatuses 122, 126 and/or light source 102 at an angle with respect to optical axis 106 of the objective lens arrangement 112 is optional and not essential to the present technology.

In some embodiments, inspection system 100 includes an objective lens arrangement 112. Including, for example, a plurality of optical elements e.g. including an objective lens and a telescope. Where objective lens arrangement 112, in some embodiments, receives and transfers light originating from light source 102 to object 116 and receives light returning (e.g. reflected and/or scattered e.g. BF signal and/or DF signal light) from object and transfers the returning light to separator 110.

In some embodiments, objective lens arrangement 112 is arranged to receive and collect light reflected from a plurality of field points on object 116 (e.g. light from the light source 102 reflected and/or scattered off a portion of the object, or transmitted through a portion of the object as in the case of a transmission microscope) and configured, in the present embodiment, for telecentric imaging at the object side.

In some embodiments, objective lens arrangement 112 is configured (e.g. element/s of the objective lens arrangement 112 are selected and/or arranged and/or aligned) such that light collected by the objective lens arrangement 112 from any given field point 136 on object surface 134 exits the objective lens arrangement 112, passing through an exit pupil 130 (illustrated as two dotted lines in FIG. 1A), as parallel rays that are imaged at infinity.

In some embodiments (e.g. to maximize correct separation of BF and DF light by the separator) exit pupil 130 of objective lens arrangement 112 is positioned at window 128 of separator. Where, in some embodiments, objective lens arrangement 112 is configured (e.g. aligned) such that an exit pupil 130 thereof is relayed to a position external (e.g. instead of internal) to the objective lens arrangement 112 e.g. external to a housing of objective lens arrangement 112. For example, by providing a pupil relay module behind (e.g. within schematic illustration 112 of the objective lens arrangement) one or more lenses of objective lens arrangement 112.

The light signal separator/divider 110, in some embodiments, is positioned at the exit pupil 130 and arranged so window 128 of the separator 110 coincides with the objective exit pupil 130, laterally and axially. In other words, the system, in some embodiments, is theoretically configured such that an entrance pupil of the objective lens arrangement matches the exit pupil of the objective lens arrangement and the back focal plane of the objective lens arrangement.

In some embodiments (e.g. to maximize a proportion of illumination light which passes through separator to objective lens arrangement e.g. while maximizing accurate separation of DF and BF light) source illumination 104 is focused to a region of window 128 and/or to pupil 130 of objective lens arrangement. Where, in some embodiments, an illumination system including light source 102, relay module 178 (and optional reflector 190) form an afocal beam at an exit pupil thereof 114. The exit pupil 114 of the illumination system, in some embodiments, is matched to an entrance pupil of the objective lens arrangement. For example, by selection and/or alignment of relay module 178 elements.

In some embodiments, objective lens arrangement 112 has an optical axis 106, in FIG. 1A parallel to a z-axis. In some embodiments, optical axis 106 is perpendicular to a plane in which a top surface 123 of platform 121 extends.

In some embodiments, separator 110 window 128 is positioned at or near (i.e. contiguous) exit pupil 130 of objective lens arrangement 112 (i.e. a theoretical position thereof e.g. determined using feature/s of optical elements of objective lens arrangement 112).

Figure 1C:
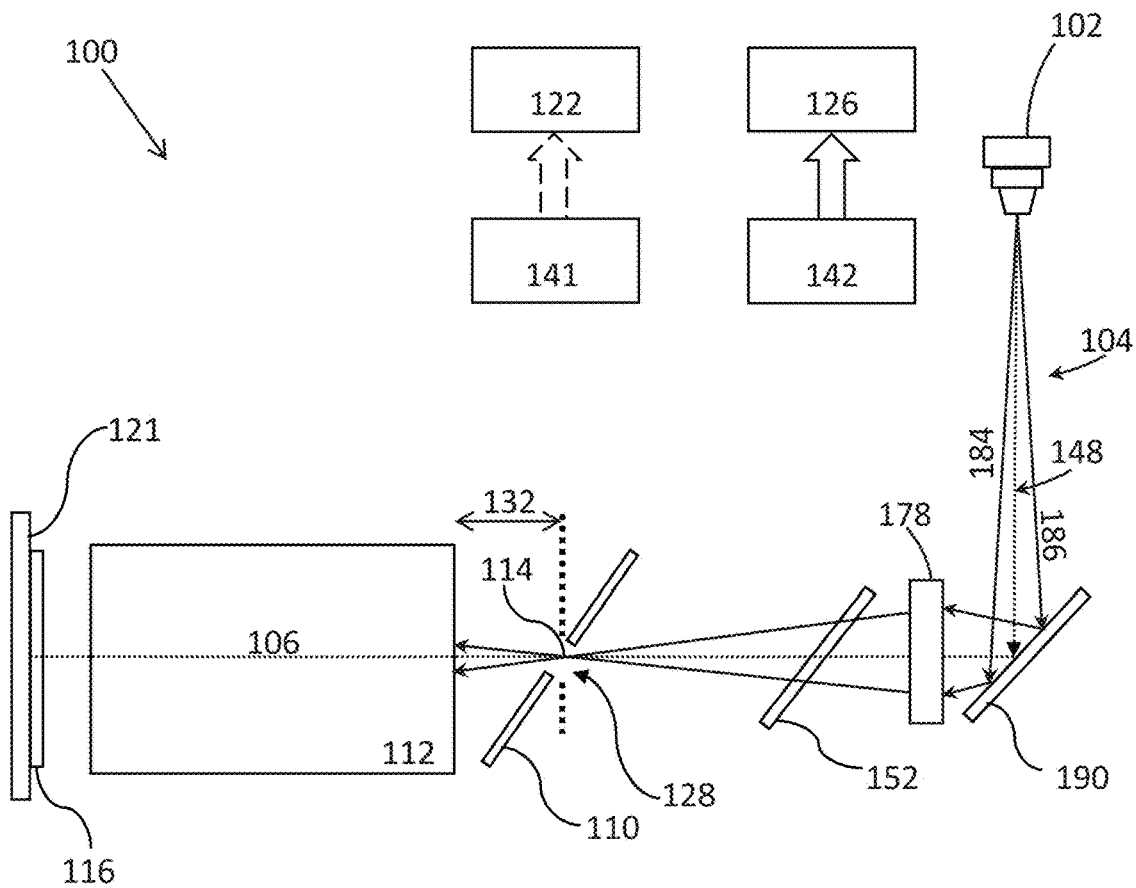
FIG. 1C is a simplified schematic of an inspection system 100 according to some embodiments of the disclosure.

FIG. 1C is a simplified schematic of an inspection system 100 according to some embodiments of the disclosure.

In FIG. 1B illumination light 104 was illustrated (e.g. simplified) as emanating from a point source 102. FIG. 1C, in some embodiments, illustrates illumination light 104 as having a field of view (FOV) e.g. as illustrated by central ray 148 and extreme rays 184, 186. FIG. 1C further illustrates relaying (e.g. by a relay module 178 which includes one or more optical elements e.g. one or more lens) of illumination light 104 (e.g. an image of illumination light to position a virtual exit pupil of light source 102) at window 128 of separator 110.

Figure 2:
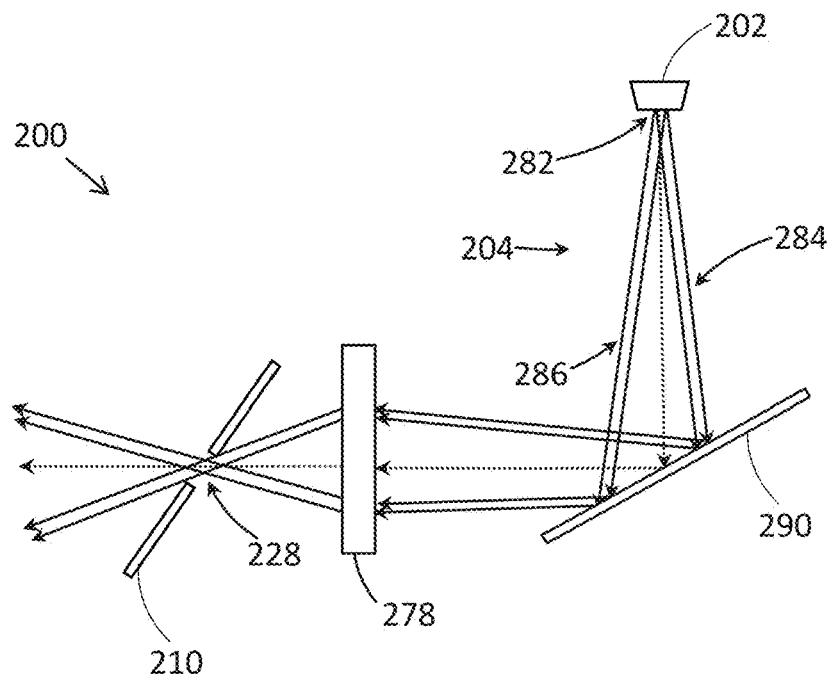
FIG. 2 is a simplified schematic cross section of a portion of an inspection system, according to some embodiments of the disclosure.

FIG. 2 is a simplified schematic cross section of a portion of an inspection system 200, according to some embodiments of the disclosure.

In some embodiments, system 200 includes a light source 202 which, in some embodiments, includes one or more feature as illustrated in and/or described regarding light source 102 FIG. 1A, FIG. 1C. In some embodiments, system 200 includes a coupling mirror 210, which, in some embodiments, includes one or more feature as illustrated in and/or described regarding coupling mirror 110 FIG. 1A, FIG. 1C. Where coupling mirror 210, in some embodiments, includes a window 228 including one or more feature of window 128 FIG. 1A, FIG. 1C. In some embodiments, system 200 includes a mirror 290 which includes one or more feature of mirror 190 FIG. 1A, FIG. 1C.

In some embodiments, a pupil 282 of light source 202 has a cross sectional area and shape. FIG. 2, in some embodiments, illustrates modeling such light, as it is (optionally directed by mirror 290) and focused by a relay module 278 to position an effective pupil of the illumination light at mirror window 228.

In some embodiments, illumination light 204 is modeled as a plurality of solid shapes, two of which 284, 286 are schematically illustrated in FIG. 2.

Exemplary Method of Separator Transmissive Region Design

Figure 3:
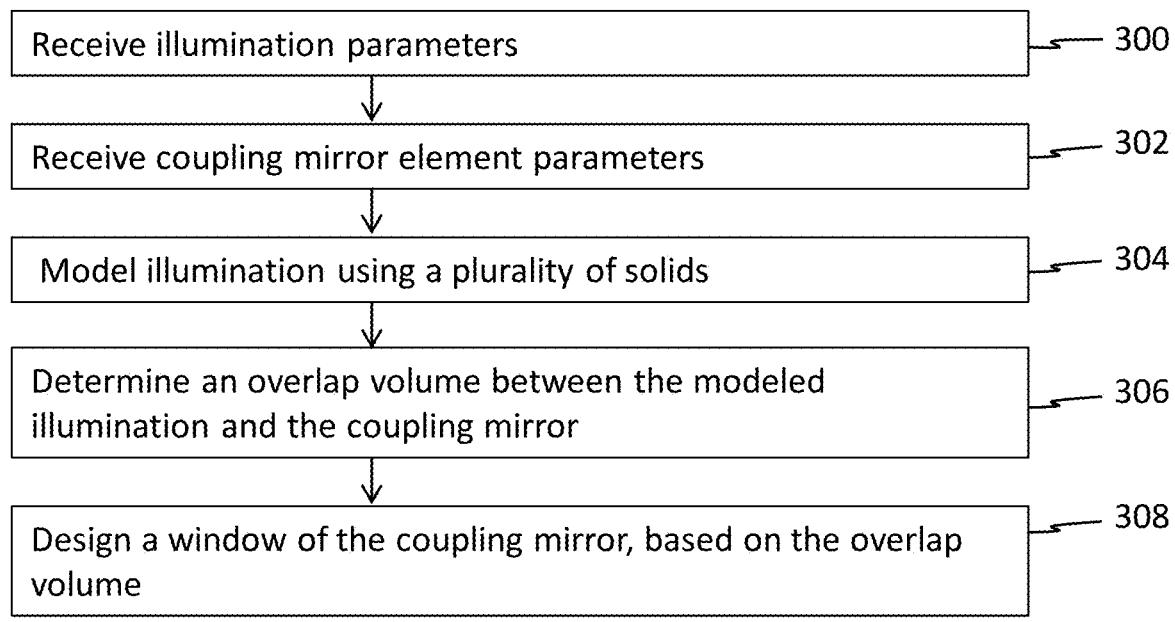
FIG. 3 is a method of coupling mirror window design, according to some embodiments of the disclosure.

FIG. 3 is a method of coupling mirror window design, according to some embodiments of the disclosure.

At 300, in some embodiments, illumination parameters are received.

In some embodiments, the illumination parameters include a shape of a light source pupil through which illumination passes into the system, the pupil defining a shape of the illumination light.

In some embodiments, the illumination parameters include quantification of shape of the light and/or light FOV with distance from the light source pupil, in some embodiments described using field angles of the illumination light. Where field angles are defined, in some embodiments, as angles of extreme rays with respect to a central optical axis of the illumination.

In some embodiments, e.g. where the light is symmetrical around the central optical axis, the shape of light and/or light FOV with distance from the light source pupil is quantified by a single field angle.

In some embodiments, e.g. where the light is symmetrical about two axes perpendicular to the light source pupil (or is simplified as being such), the shape of the light and/or light FOV with distance from the light source pupil is quantified a two field angles, one angle for each of the two perpendicular directions. For example, referring to FIG. 4A and FIG. 4B where the central optical axis is parallel to a z-direction and the two field angles are θx and θy.

In some embodiments, more than two field angles are used to quantify the light, e.g. where an angular extent with respect to the light source pupil is provided with each angle e.g. where field angle is described as with respect to (e.g. as a function of position of) extreme ray emergence from the light source pupil.

Where, in a scanning illumination system, the field angles describe the most extreme angled light beams when scanning e.g. the field angles describing the FOV of the scanning illumination system.

Where, in an aerial illumination system, in some embodiments, field angles are defined as angles defining a region of space extending from the entrance pupil in which in which the system (e.g. the light source and/or objective) conform to one or more optical performance requirement. Exemplary requirements including one or more of a maximal wavefront error, field distortion, image uniformity, and telecentricity.

In some embodiments, the region of defined by the field angles is considered to be the FOV of the system.

At 302, in some embodiments coupling mirror parameters are received. For example, including geometry of the coupling mirror e.g. including a thickness of the mirror. For example, including an angle of the mirror with respect to other element/s of the inspection system. For example, a distance between the mirror and other element/s of the inspection system, for example, a pupil relief distance between the coupling mirror and objective lens arrangement e.g. pupil relief 132 distance FIG. 1A. For example, including mirror material and/or optical parameter/s.

At 304, in some embodiments, the illumination is modeled. For example, using a plurality of solid shapes each solid shape modeling an extremity of the illumination light.

Where, in some embodiments, a solid shape is modeled for two opposing extremities for two directions perpendicular to a central optical axis of the illumination. For example, according one or more feature as illustrated and/or described regarding FIGS. 4C-E and/or FIGS. 5A-B, and/or FIGS. 6A-B, and/or FIGS. 7A-B, and/or FIGS. 8A-B, and/or FIGS. 9A-B, and/or FIGS. 10A-B.

In some embodiments, e.g. when light shape is quantified by more than two field angles, more than two solid shapes are used to model the light e.g. a solid shape for each field angle and/or corner of a shape of the light source pupil (e.g. a pentagon shaped light source, in some embodiments, being modeled by 5 solid shapes).

At 306, in some embodiments, an overlapping volume between the coupling mirror and the illumination is determined using the coupling mirror parameters and the illumination model.

At 308, in some embodiments, a window in the coupling mirror is designed, using the intersection volume. Where, in some embodiments, the hole is formed (e.g. cut into the coupling mirror) according to the design.

Figure 16:
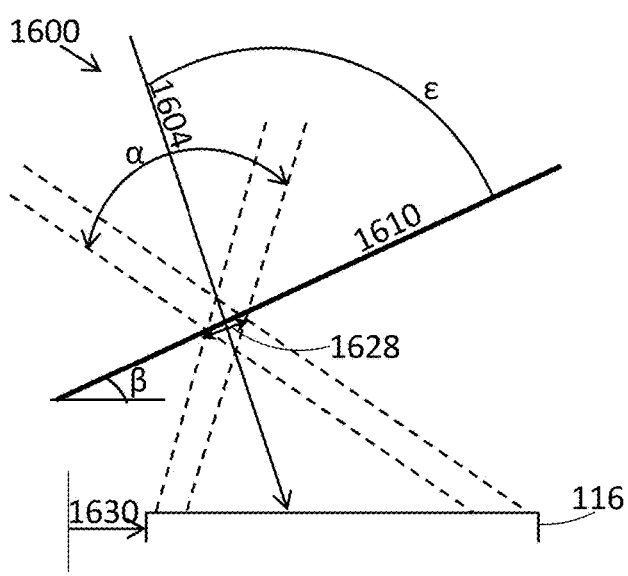

In some embodiments, e.g. referring to FIG. 16, the method of FIG. 3 is used to design a coupling mirror having a shape of the window design of step 308.

Exemplary Illumination Modeling

Figure 4A:
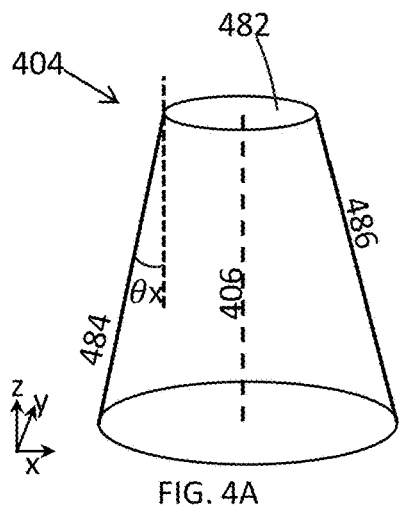
FIGS. 4A-B are simplified schematics of illumination light, according to some embodiments of the disclosure.
Figure 4B:
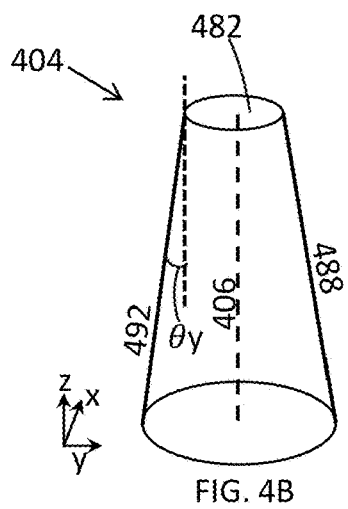

FIGS. 4A-B are simplified schematics of illumination light 404, according to some embodiments of the disclosure.

FIG. 4A and FIG. 4B, in some embodiments, illustrate different views of exemplary illumination light 404 and/or (e.g. in the case of scanning illumination) illumination light FOVs 404. Light emanates from pupil 482, where an optical central axis 406 of the light (and/or light FOV) is parallel to a z-axis. Extreme rays 484, 486 in an x-direction are illustrated, where a field angle θx in the x-direction is taken between extreme ray/s 484, 486 and central optical axis 406 of the illumination light. Extreme rays 484, 486 in an y-direction are illustrated where a field angle θy in the y-direction is taken between extreme ray/s 492, 488 and optical axis 406.

Figure 4C:
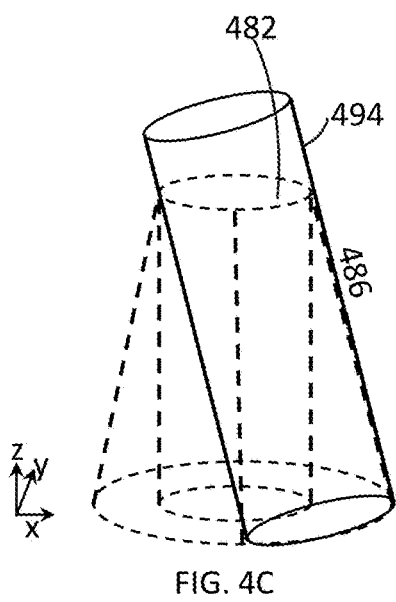
FIGS. 4C-4D illustrate modeling of illumination light, according to some embodiments of the disclosure.
Figure 4D:
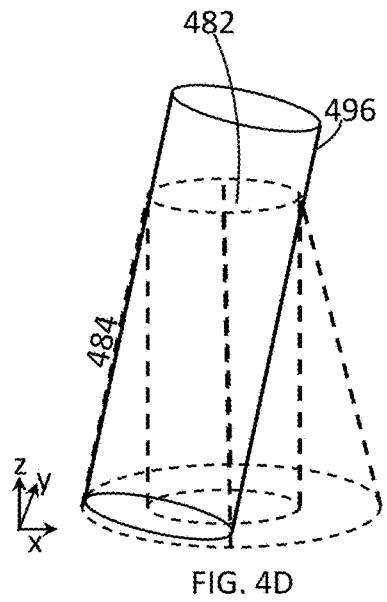

FIGS. 4C-4D illustrate modeling of illumination light, according to some embodiments of the disclosure.

In FIGS. 4C-D, both illumination light and/or (e.g. in the case of scanning illumination) illumination light FOVs are illustrated with dashed lines and a solid shape having a same cross section as pupil 482 and aligned with the central optical axis 406.

Modeling of light 404 e.g. as described within this document is illustrated in FIGS. 4C-D by solid shapes 494 FIG. 4C, 496 FIG. 4D having cross section of pupil 482, and extending from pupil 482 along a direction of x-direction marginal rays 486 FIG. 4C, 484 FIG. 4D.

Figure 4E:
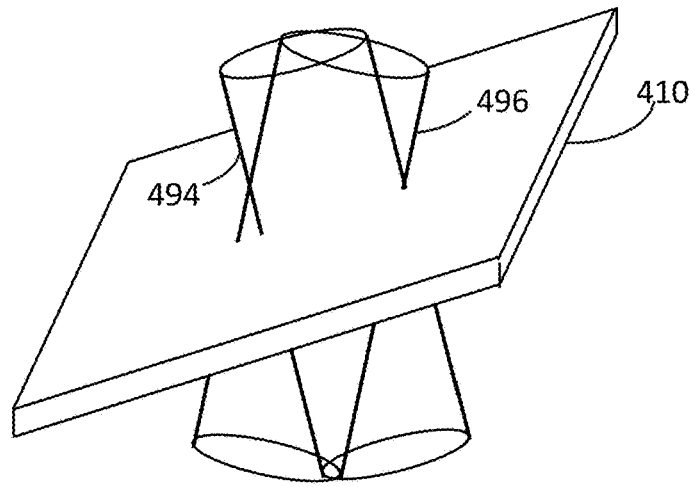
FIG. 4E illustrates modeling of an overlap volume, according to some embodiments of the disclosure.

FIG. 4E illustrates modeling of an overlap volume, according to some embodiments of the disclosure.

In FIG. 4E illustrated are solid volumes 494, 496 modeling x-axis direction light extremities, as overlapping with a coupling mirror 410. In some embodiments, modeling of light 402 includes determining a solid volume for each extremity of the light (e.g. two additional solids modelling y-axis extremities of the light), where the overlap of the solids (e.g. four solids) and coupling mirror is used to determine a mirror window shape.

Figure 5A:
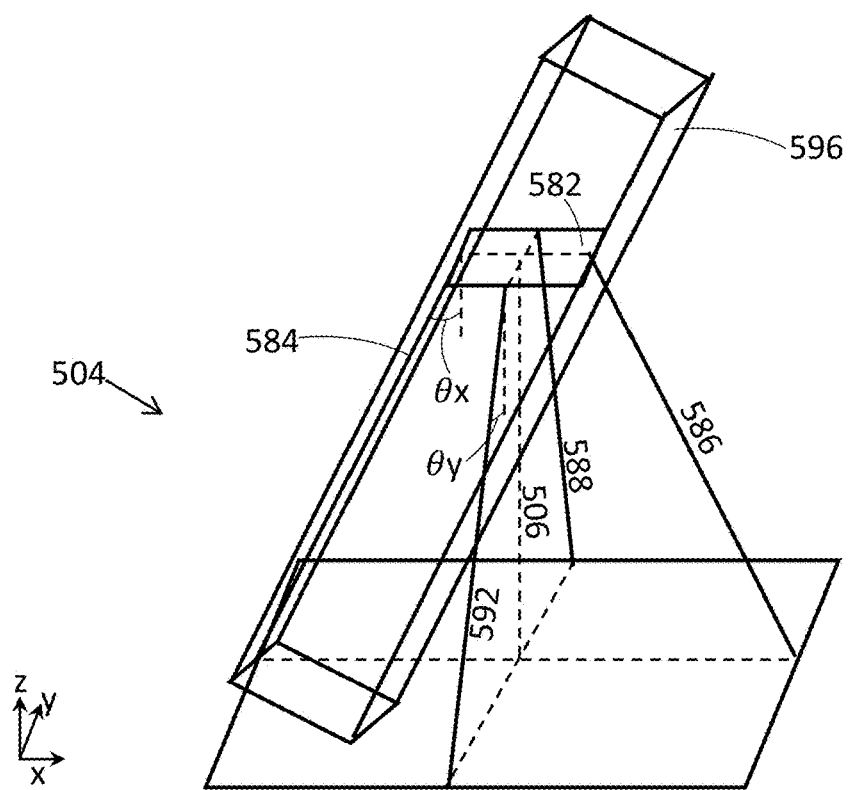
FIG. 5A is a simplified schematic of illumination light, according to some embodiments of the disclosure.

FIG. 5A is a simplified schematic of illumination light 504, according to some embodiments of the disclosure.

Illustrated in FIG. 5A are a rectangular shaped illumination pupil 582, light 504 (and/or an FOV of illumination light, where the term "light" or "illumination light" should be understood to refer both to the light and an illumination FOV) having a central optical axis 506 parallel to a z-axis. Where light 504 has x-axis extreme rays 584, 586, and y-axis extreme rays 588, 592.

Although illustrated in this document are circular and rectangular illumination pupil cross sections, other shapes are envisioned and encompassed by the current disclosure. For example, oval cross section, cross sections with larger numbers of edges and/or corners e.g. pentagon, hexagon. For example, irregular shapes. Where, in some embodiments, modeling of such shapes includes determining solids having cross section of the pupil cross section, orientated in directions of differing and/or extreme field angles.

Illustrated in FIG. 5A is modeling of illumination light using a solid 596 having cross sectional shape of entrance pupil 582 and orientated in alignment with extreme ray 584.

Figure 5B:
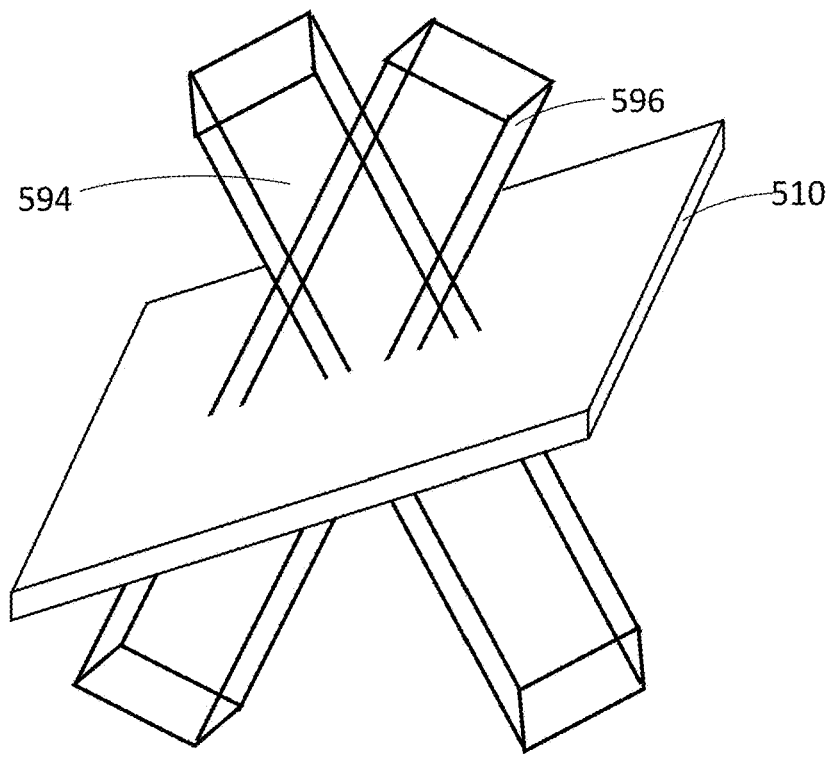
FIG. 5B illustrates modeling of an overlap volume, according to some embodiments of the disclosure.

FIG. 5B illustrates modeling of an overlap volume, according to some embodiments of the disclosure.

In FIG. 5B illustrated are solid volumes 594, 596 modeling x-axis direction light extremities, as overlapping with a coupling mirror 510. In some embodiments, modeling of light 504 includes determining a solid volume for each extremity of the light (e.g. two additional solids modelling y-axis extremities of the light), where the overlap of the solids (e.g. four solids) and coupling mirror is used to determine a mirror window shape.

FIG. 6A is a simplified schematic illustrating modelling of illumination light as it interacts with a coupling mirror 610, according to some embodiments of the disclosure.

FIG. 6B illustrates a shape at a surface plane 634 of a coupling mirror 610, according to some embodiments of the disclosure.

FIGS. 6A-6B illustrate modelling of illumination light which has symmetrical extent and where coupler 610 is orientated perpendicular to a central optical axis 604 of illumination.

FIG. 6A, in some embodiments, illustrates modeling of an extent of illumination light, as it interacts with coupling mirror 610 as a plurality of solids 638, 640, 642, 644. Each of solids 638, 640, 642, 644 orientated along an extreme ray of the illumination light. Where, in the embodiment of FIG. 6A, solids 638, 640, 642, 644 are cylinders modeling light of an illumination source having a circular shape pupil.

FIG. 6B, in some embodiments, illustrates intersection of cylinders 638, 640, 642, 644 with a surface (e.g. top surface 634 and/or bottom surface 636) of coupling mirror 610. Where, oval 646, in some embodiments, corresponds with intersection of cylinders 642, 644. Where oval 648, in some embodiments, corresponds with intersection of cylinders 638, 640. FIGS. 6A-B, in some embodiments, relate to an embodiment where field angles are symmetrical (e.g. referring back to FIGS. 4A-B, where θx and θy are equal). Where circle 650 illustrates a smallest circular shape containing both of ovals 646, 648.

FIG. 7A is a simplified schematic illustrating an extent of illumination light as it interacts with a coupling mirror 710, according to some embodiments of the disclosure.

FIG. 7B illustrates a shape 728 at a surface plane of a coupling mirror 710, according to some embodiments of the disclosure.

FIGS. 6A-6B illustrate modelling of illumination light which has symmetrical extent and where coupler 610 is orientated perpendicular to a central optical axis 604 of illumination.

FIG. 7A, in some embodiments, illustrates modeling of an extent of illumination light, as it interacts with coupling mirror 710 as a plurality of cylinders 738, 740, 742, 744. Where, in the embodiment of FIG. 7A, solids 738, 740, 742, 744 are cylinders modeling light of an illumination source having a circular shape entrance pupil. Each of solids 738, 740, 742, 744 delineating a field angle of illumination light. Where, in FIG. 7A, illumination has different field angles in different directions, where θ1>θ2.

FIG. 7B, in some embodiments, illustrates intersection of cylinders 738, 740, 742, 744 with a surface (e.g. top surface 734 and/or bottom surface 736) of coupling mirror 710. Where, oval 746, in some embodiments, corresponds with intersection of cylinders 740, 744 with coupling mirror 710. Where oval 748, in some embodiments, corresponds with intersection of cylinders 742, 744 with coupling mirror 710. Where, in some embodiments, oval 750 illustrates a smallest oval shape containing both of ovals 746, 748.

FIG. 8A is a simplified schematic illustrating modelling of illumination light as it interacts with a coupling mirror 810, according to some embodiments of the disclosure.

FIG. 8B illustrates a shape 828 at a surface plane of a coupling mirror 810, according to some embodiments of the disclosure.

FIG. 8A-B, in some embodiments, illustrates an embodiment where illumination has the same features as the embodiment illustrated in FIGS. 6A-B (solids 838, 840, 842, 844 are cylinders according to a circular shaped illumination entrance pupil, field angles are symmetrical), but where a coupling mirror 710 is positioned at an angle to an optical central axis 804 of the illumination.

Referring to FIG. 8B ovals 852, 848, 854, 846, in some embodiments, corresponding with intersection of cylinders 838, 842, 844, 840 respectively. Where, in some embodiments, circle 850 illustrates a smallest circular or ellipsoid shape containing all of ovals 852, 848, 854, 846.

Figure 9A:
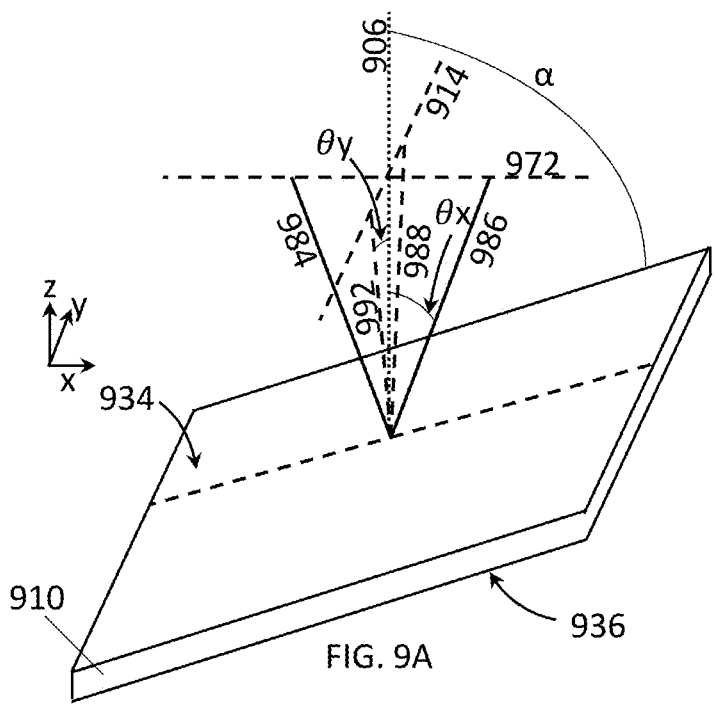
FIG. 9A is a simplified schematic illustrating modelling of illumination light as it interacts with a coupling mirror, according to some embodiments of the disclosure.

FIG. 9A is a simplified schematic illustrating an extent of illumination light as it interacts with a coupling mirror 910, according to some embodiments of the disclosure.

Figure 9B:
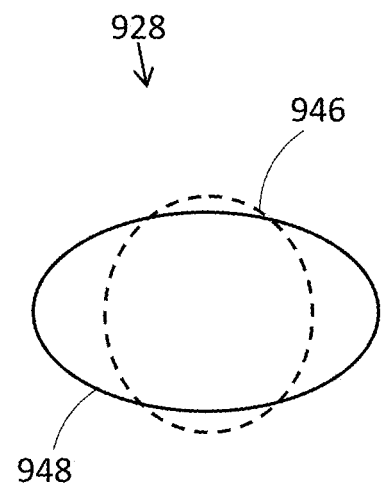
FIG. 9B illustrates a shape at a surface plane of a coupling mirror, according to some embodiments of the disclosure.

FIG. 9B illustrates a shape 928 at a surface plane of a coupling mirror 910, according to some embodiments of the disclosure.

Figure 10A:
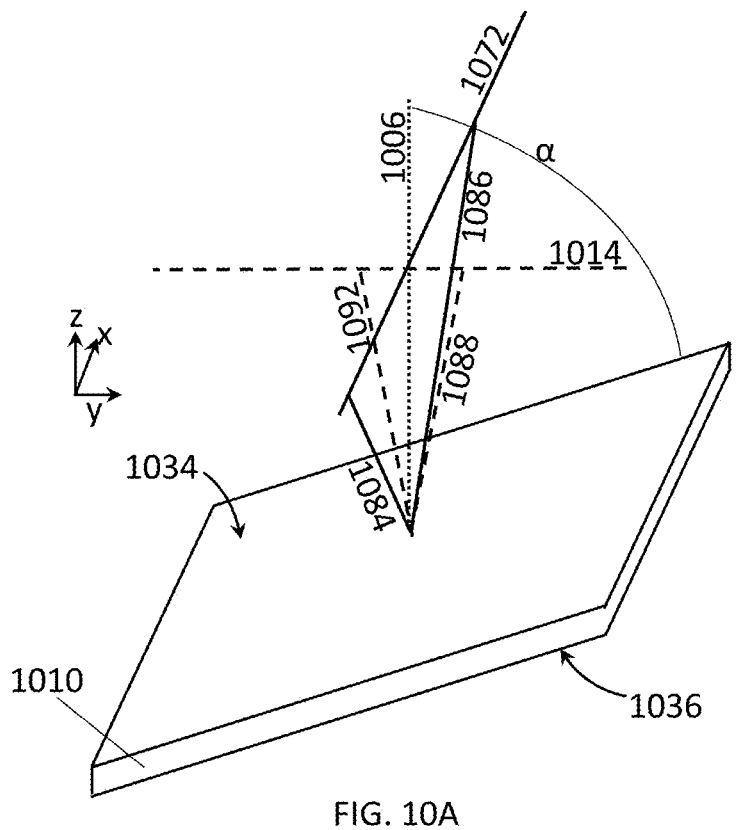
FIG. 10A is a simplified schematic illustrating an extent of illumination light as it interacts with a coupling mirror, according to some embodiments of the disclosure.

FIG. 10A is a simplified schematic illustrating an extent of illumination light as it interacts with a coupling mirror 1010, according to some embodiments of the disclosure.

Figure 10B:
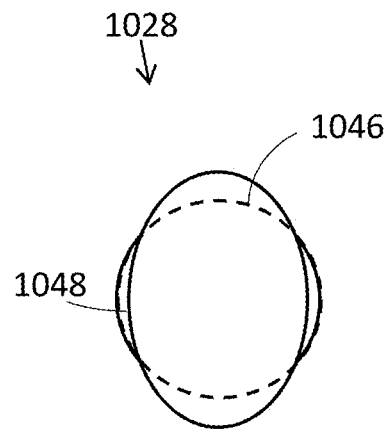
FIG. 10B illustrates a shape at a surface plane of a coupling mirror, according to some embodiments of the disclosure.

FIG. 10B illustrates a shape 1028 at a surface plane of a coupling mirror 1010, according to some embodiments of the disclosure.

In some embodiments, the coupling mirror is tilted in a single direction perpendicular to an optical axis of illumination or has a higher angle of tilt in one direction (perpendicular to an optical axis of illumination) than another. For example, referring to e.g. referring to FIG. 9A and FIG. 10A, in some embodiments coupling mirror 910, 1010 is tilted in an x-direction and not (or is less tilted) in a y-direction where the optical axis 906, 1006 is parallel to a z-direction.

In some embodiments, illumination has a larger extent and/or a higher field angle in e.g. in one direction than another. For example, referring back to FIG. 4A and FIG. 4B where θx is larger than θy.

FIG. 9A, in some embodiments, illustrates extreme rays of illumination light, where the illumination light is focused to top surface 934 of coupling mirror 910. Where illustrated are a central optical axis 906 and extreme rays 984, 986, 992, 988 of the illumination light in two directions; x-direction marginal rays 984, 986 and y-direction extreme rays 992, 988. Line 972 is a line extending in the x-direction and intersecting central optical axis 906. Line 914 is a line extending in the y-direction and intersecting central optical axis 906.

FIG. 9A and FIG. 10A, in some embodiments, illustrate asymmetrical illumination where θx is larger than θy. In some embodiments, coupling mirror 910, 110 is at an angle α (e.g. coupling mirror 910 is tilted) with respect to central optical axis 906, 1006 of the illumination light.

FIG. 9A and FIG. 10A, in some embodiments, illustrate a same illumination and a same coupling mirror, where an orientation of the illumination is rotated by 90 degrees with respect to the mirror (or equally vice versa). Where, in FIG. 9A, the larger field angle θx of the illumination is aligned with the tilting of coupling mirror 910 and in FIG. 10, the smaller field angle θy of the illumination is aligned with tilting of coupling mirror 1010.

FIG. 9B and FIG. 10B illustrate intersections between modeled illumination light and the coupling mirror for orientation of the illumination with respect to the coupling mirror as illustrated respectively in FIG. 9A and FIG. 10B.

Where intersection of a single cylinder in each direction is illustrated, for simplicity, as, in some embodiments, the cylinder at a smaller angle to the mirror surface is associated with a larger intersection shape on the mirror surface, for example, referring to FIG. 9B, intersection of a cylinder orientated to extreme ray 986 is larger than that of a cylinder orientated to extreme ray 984.

Referring to FIG. 9B, in some embodiments, oval 946 corresponds to cylinders orientated to extreme rays 992 and 988, oval 948 corresponds to a cylinder orientated to 986.

Referring to FIG. 10B, in some embodiments, oval 1046 corresponds to cylinders orientated to extreme ray 1088, oval 1048 corresponds to cylinders orientated to extreme rays 1084, 1086.

Exemplary Detailed Method of Separator Transmissive Region Design

Figure 11:
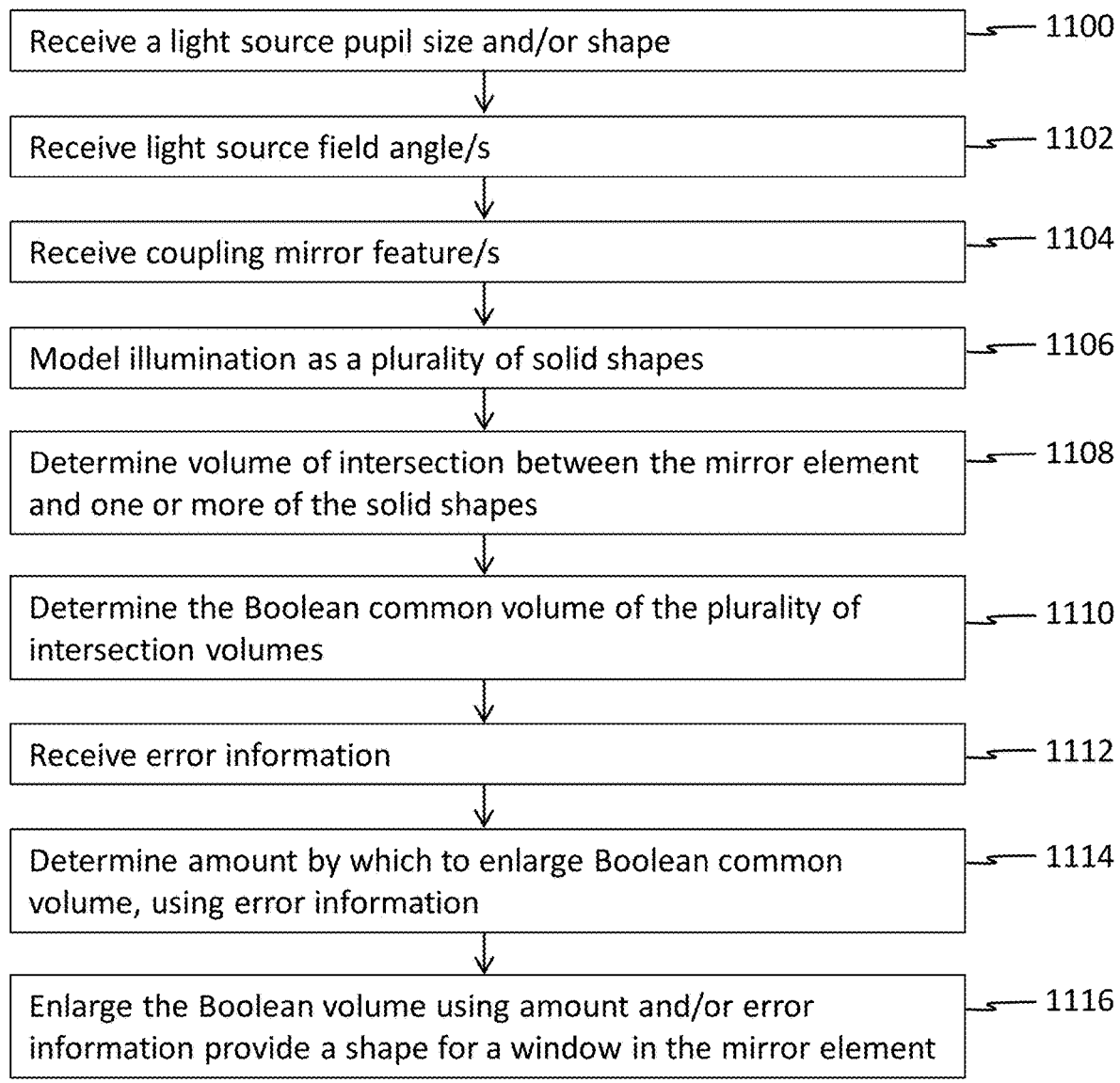
FIG. 11 is a method of coupling mirror window design, according to some embodiments of the disclosure.

FIG. 11 is a method of coupling mirror window design, according to some embodiments of the disclosure.

At 1100, in some embodiments, a shape and/or size of a light source pupil through which illumination for inspection passes is received.

At 1102, in some embodiments, field angles of illumination light are received. Where, in some embodiments, field angles are received with a relationship of each field angle to respective location with respect to the light source pupil and/or with respect to other system elements e.g. with respect to tilt angle/s of the separator.

At 1104, in some embodiments, coupling mirror feature/s are received. For example, including a position and/or orientation and/or geometry of a coupling mirror (e.g. a position and/or orientation of a first plane and/or a second plane of the coupling mirror e.g. planes 934, 936 FIGS. 9A), with respect to field angles of illumination light is received. In some embodiments, position of planes of the mirror element with respect to field angles of the illumination light are received.

At 1106, in some embodiments, illumination light is modeled as a plurality of solid shapes, each shape representing an extreme field angle of the illumination. Modelling, in some embodiments, according to one or more feature of step 304 FIG. 3. Where modeling, in some embodiments, is based on the received entrance pupil shape (e.g. received at step 1100) and/or field angles of the illumination (e.g. received at step 1102).

At 1108, in some embodiments, a volume of intersection between the coupling mirror and one or more of (e.g. each of) the plurality of cylinders is determined.

At 1110, in some embodiments, a Boolean common volume of the plurality of intersection volumes is determined.

At, 1112, in some embodiments, error information regarding non-ideal characteristics and/or errors in system are received.

Where error information, in some embodiments, includes non-ideal features which affect the required sized of the transmissive portion of the separator.

For example, feature/s which affect size and/or position of the entrance and/or exit pupil of the objective.

For example, non-ideal features which affect a size and/or shape of illumination light reaching the separator e.g. including non-ideal features which affect positioning of the illumination pupil at the separator.

Exemplary features potentially affecting size and/or shape of illumination light at the separator including one or more of:

Error/s in illumination light size and/or shape, e.g. as received at step 1100

Error/s in field angle/s of illumination light, e.g. as received at step 1102

Error/s associated with the relay module (e.g. magnification error e.g. telecentricity error)

Error/s in coupling mirror geometry and/or position e.g. as received at step 1104

For example, error in coupling mirror window thickness.

For example, error in coupling mirror tilt angle.

For example, centering of the coupling mirror with respect to a center of the illumination and/or objective.

Error/s in positioning of pupil/s at the coupling mirror:

For example, error/s in alignment of the illumination pupil to the coupling mirror e.g. associated with non-ideal nature of element/s of the illumination system and/or associated with positioning error/s of the coupling mirror and illumination system.

For example, error/s in alignment of the objective entrance and/or exit pupils to the coupling mirror e.g. associated with non-ideal nature of element/s of the objective and/or inaccuracy of positioning of the objective with respect to the coupling mirror.

Alignment errors/s associated with movement of one or more moving mechanical part:

For example, where an objective includes different magnification options which involve movement of different parts into position.

For example, where illumination includes scanning of light across an illumination FOV. Where, in some embodiments, optical aberrations (e.g. in element/s of the relay module and/or other illumination system element/s) contribute to "wandering" of the illumination pupil. In other words, in some embodiments, error/s include pupil distortion where the magnification of the illumination pupil varies when different field points are illuminated.

For example, jitter e.g. associated with one or more moving part. Where, in some embodiments, jitter is defined as a recurring change a parameter over time.

At, 1114, in some embodiments, the error information is used to determine an amount e.g. a dimension, (optionally, with direction) by which to enlarge the intersection Boolean common volume.

At 1116, in some embodiments, the Boolean volume is enlarged using the non-ideal characteristics/s information to provide a shape for a window in the coupling mirror. For example, to ensure that all (or above a threshold proportion) of the illumination light is able to pass through the window.

In some embodiments, the volume is enlarged by equal amounts on each surface of the window volume e.g. walls of the volume are recessed away from the Boolean volume by a same dimension for the entire surface of the walls.

In some embodiments, the volume is enlarged by different amounts on different surface, for example, where system error/s are non-symmetrical.

In some embodiments, the volume is changed (e.g. enlarged) to remove sharp edges e.g. to provide a more mechanically robust separator.

In an exemplary embodiment, the enlargement compensates for non-ideal characteristic/s of the relay module. For example, to compensate for inaccuracy of positioning of the illumination pupil at the coupling mirror.

Exemplary Separators

Figure 12:
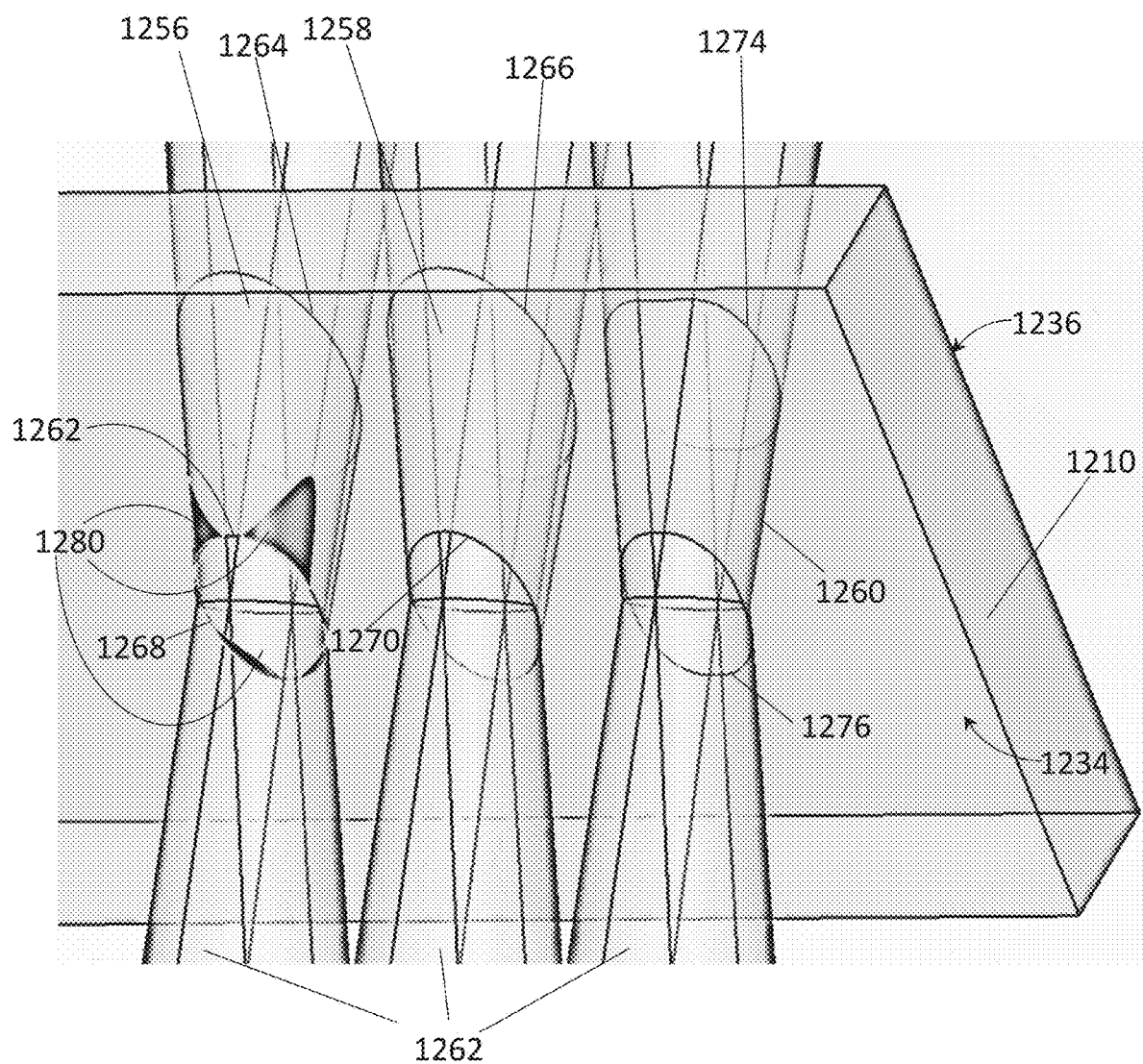
FIG. 12 is a simplified schematic of coupling mirror windows, according to some embodiments of the disclosure.

FIG. 12 is a simplified schematic of coupling mirror 1210 windows 1256, 1258, 1260, according to some embodiments of the disclosure.

Illustrated in FIG. 12, for each window, is a model of illumination 1262 passing through the respective window.

Window 1256 and window 1258 each have, respectively, an oval shape 1264, 1266, at surface 1236 and have an oval shape 1268, 1270 at surface 1234 of coupling mirror 1210. Where, in some embodiments, walls of windows 1256, 1258 extend as straight line and/or lowest surface area surfaces between the oval shapes 1264, 1266 and oval shapes 1268, 1270.

Window 1256 is undersized, where portions 1280 of illumination 1262 are "cut" or "blocked" e.g. not allowed to pass through coupling mirror 1210. However, this configuration has a potentially higher proportion of DF light signal (e.g. DF light 120 FIG. 1) directed by coupling mirror 1210 to a DF detector (e.g. dark field detector 122 FIG. 1).

Window 1258 is defined by closest fit ovals 1266, 1270 to cylinder intersection with surfaces 1234, 1236. Where closest fit ovals are as described Window 1260, in some embodiments, has a shape of intersection between modelling of illumination 1262 (e.g. as described elsewhere in this document) and coupling mirror 1210, window 1260 having a window opening shape 1274 at surface 1236 and a window opening shape 1276 at surface 1234.

Figure 13A:
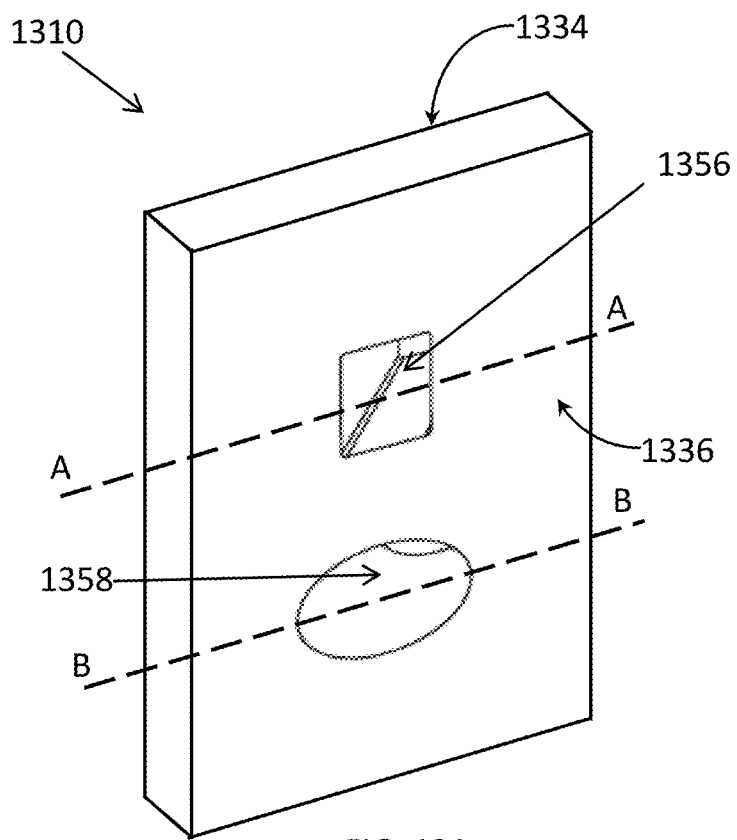
FIG. 13A is a simplified schematic of a coupling mirror, according to some embodiments of the disclosure.

FIG. 13A is a simplified schematic of a coupling mirror 1310, according to some embodiments of the disclosure.

Coupling mirror 1310, in some embodiments, has a first surface 1336 and a second surface 1334. In some embodiments, one or both of first and second surface 1336, 1334 are planar (e.g. varying by at most 0.5 mm, or 0.1 mm from planar).

In some embodiments, coupling mirror 1310 includes one or more windows. For example, a plurality of windows 1356, 1358.

In some embodiments, window 1356 is configured (e.g. designed according to FIG. 5A and/or FIG. 5B) for a square or rectangular shape illumination pupil.

In some embodiments, window 1358 is configured (e.g. designed according to) for a circular or oval shaped illumination pupil.

Figure 13B:
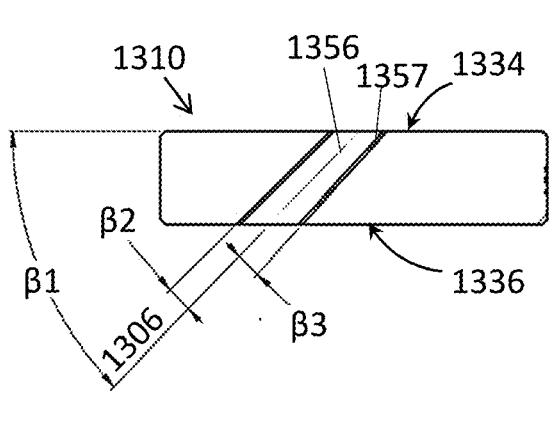
FIGS. 13B-C are simplified schematic sectional views of coupling mirror windows, according to some embodiments of the disclosure.
Figure 13C:
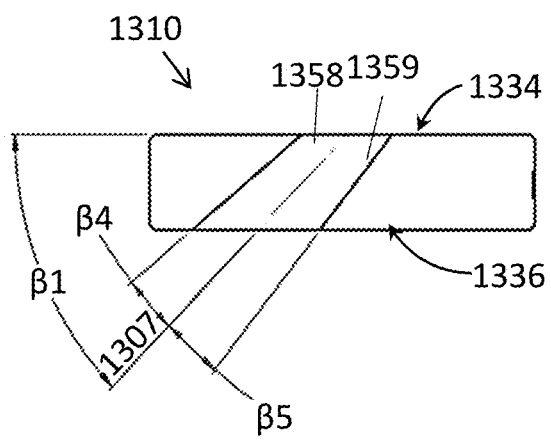

FIGS. 13B-C are simplified schematic sectional views of coupling mirror 1310 windows 1356, 1358, according to some embodiments of the disclosure.

Where FIG. 13B, in some embodiments, illustrates a sectional view of window 1356 FIG. 13, e.g. taken along line A-A. Where exemplary angles of window walls 1357

Where FIG. 13C, in some embodiments, illustrates a sectional view of window 1358 FIG. 13, e.g. taken along line B-B.

In some embodiments, exemplary mirror cross sectional views of FIG. 13B and/or FIG. 13C illustrate exemplary angles of central optical axes 1306, 1307 of windows 1356, 1358 respectively. Where, in some embodiments, a window central optical axis is aligned with a central optical axis of illumination light. In some embodiments, an angle of a surface 1334 to central optical axis 1306, 1307 is 10°-80°, or 30°-60°, or 40°-50°, or about 45 or lower or higher or intermediate ranges or angles. In some embodiments, angles β2, β3, β4, β5 defining geometry of window inner walls 1357 and/or 1359 are 0.5°-10°, or 1°-2°, or about 1.5°, or 5°-7°, or about 5°, or lower or higher or intermediate ranges or angles.

Exemplary System Design

Figure 14:
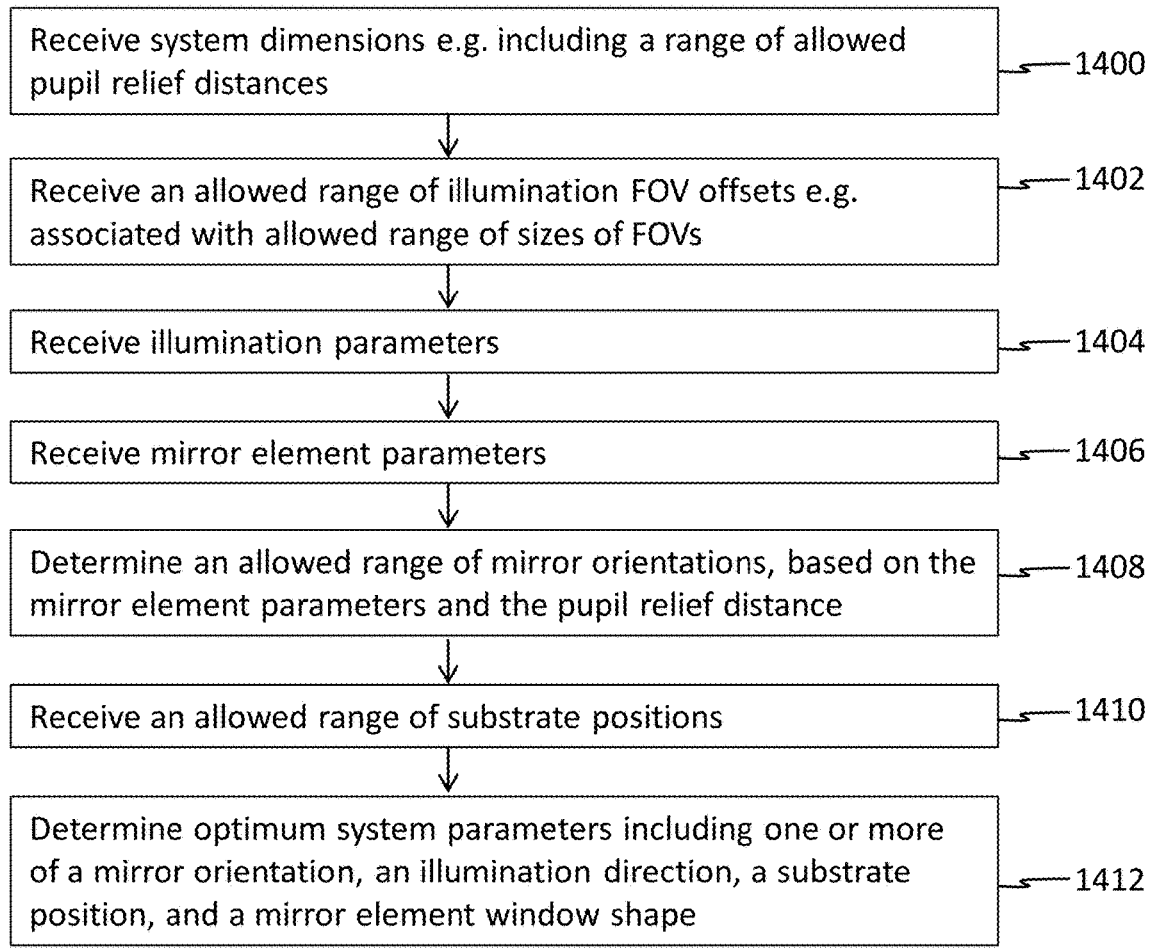
FIG. 14 is a method of optical inspection system design, according to some embodiments of the disclosure.

FIG. 14 is a method of optical inspection system design, according to some embodiments of the disclosure.

At 1400, in some embodiments, system dimensions, for example, including a range of allowed pupil relief distances is received. Where the pupil relief is a distance between a center of a separator transmissive window and an objective (e.g. referring to FIG. 1A, pupil relief 132, transmissive window 128, and objective 112).

At 1402, in some embodiments, an allowed range of illumination directions is received. For example referring to FIG. 4 and FIG. 5 where different illumination directions 404, 504 are illustrated. Where, in some embodiments, allowed angles are associated with a maximum allowed illumination FOV. As, in some embodiments, angle of illumination with respect to other system element/s is associated with size of the illumination FOV (e.g. increasing angle increases size of the FOV).

At 1404, in some embodiments, illumination parameters are received e.g. according to one or more feature of step/s 1100 and/or 1102 FIG. 11.

At 1406, in some embodiments, coupling mirror parameters are received e.g. according to one or more feature of step 1104 FIG. 11.

At 1408, in some embodiments, an allowed range of coupling mirror orientations are determined, based on the received coupling mirror parameters and allowed pupil relief distances. Where, for example, size of the mirror (e.g. combined with pupil distance) is associated with an allowable range of tilt angles (angle ß in FIG. 15 and FIG. 16) for the mirror.

At 1410, in some embodiments, an allowed range of substrate positions is received. Different substrate positions, for example illustrated for substrate 116 in FIG. 15 and FIG. 16.

At 1412, in some embodiments, optimum system parameters are determined, parameters including one or more of a mirror orientation, an illumination direction, a substrate position, and a coupling mirror window shape (where coupling mirror window shape is determined, for example, according to one or more feature of FIG. 3 and/or FIG. 11).

Figure 15:
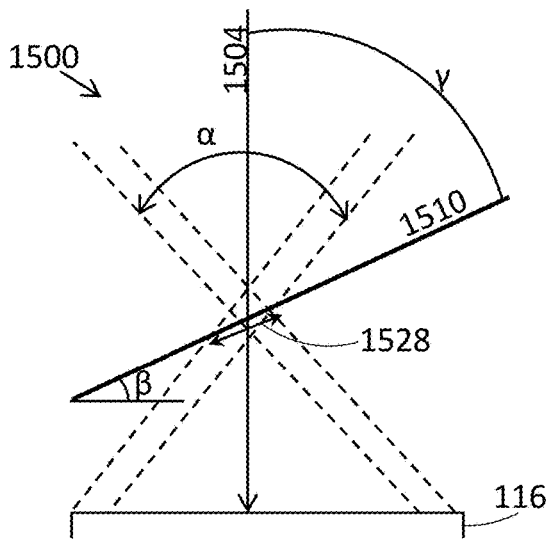
FIGS. 15-16 are simplified schematic cross sections of inspection systems, according to some embodiments of the disclosure.

FIGS. 15-16 are simplified schematic cross sections of inspection systems 100 and 200, according to some embodiments of the disclosure.

FIGS. 15-16, in some embodiments, illustrate different geometries of exemplary systems, where illustrated, for clarity, are only a subset of elements making up exemplary inspection system/s. In particular, in some embodiments, connection between substrate 116 and mirror 1510, 1610 is simplified as the illustration lacks an objective (e.g. objective 112 FIGS. 1A-C).

Illustrated in FIG. 15 and FIG. 16 respectively are, a coupling mirror 1510, 1610 (e.g. which includes one or more feature of coupling mirror 110 FIGS. 1A-C) and a substrate 116, and an illumination central optical axis 1504, 1604.

Referring now to FIG. 15, illumination light having central optical axis 1504, orientated at an angle γ with respect to coupling mirror 1510. Where coupling mirror 1510 is tilted with respect to substrate 116 by an angle β. Where an extent of the illumination light is illustrated by angle α and where modeling of the illumination light is illustrated as dashed lines (which, e.g. illustrate solids modeling illumination light as described elsewhere in this document). Where the solids define a transmissive window 1528 in coupling mirror 1510 to illuminate substrate 111 (in some embodiments, the light passes through one or more optical elements not illustrated in FIG. 15). Where angles α, γ, in some embodiments, affect a size of window 1528 in required the illuminating light to pass through the coupling mirror (e.g. without clipping at edges).

Referring now to FIG. 16, which illustrates the same system as FIG. 15, where angles α and β are the same as those of the system of FIG. 15 but where the central optical axis of illumination 1604 is at a higher angle, ε to the mirror which reduces a required size of transmissive window 1628 in the coupling mirror but, in some embodiments, increases a size of an illumination FOV on substrate 116. In some embodiments, an associated (e.g. with angling of the illumination) shift in positioning of the illumination FOV is compensated for by a lateral movement in position of substrate 116.

General

As used within this document, the term "about" refers to ±20%

The terms "comprises", "comprising", "includes", "including", "having" and their conjugates mean "including but not limited to".

The term "consisting of" means "including and limited to".

As used herein, singular forms, for example, "a", "an" and "the" include plural references unless the context clearly dictates otherwise.

Within this application, various quantifications and/or expressions may include use of ranges. Range format should not be construed as an inflexible limitation on the scope of the present disclosure. Accordingly, descriptions including ranges should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within the stated range and/or subrange, for example, 1, 2, 3, 4, 5, and 6. Whenever a numerical range is indicated within this document, it is meant to include any cited numeral (fractional or integral) within the indicated range.

It is appreciated that certain features which are (e.g., for clarity) described in the context of separate embodiments, may also be provided in combination in a single embodiment. Where various features of the present disclosure, which are (e.g., for brevity) described in a context of a single embodiment, may also be provided separately or in any suitable sub-combination or may be suitable for use with any other described embodiment. Features described in the context of various embodiments are not to be considered essential features of those embodiments, unless the embodiment is inoperative without those elements.

Although the present disclosure has been described in conjunction with specific embodiments thereof, it is evident that many alternatives, modifications, and variations will be apparent to those skilled in the art. Accordingly, this application intends to embrace all such alternatives, modifications and variations that fall within the spirit and broad scope of the appended claims.

All references (e.g., publications, patents, patent applications) mentioned in this specification are herein incorporated in their entirety by reference into the specification, e.g., as if each individual publication, patent, or patent application was individually indicated to be incorporated herein by reference. Citation or identification of any reference in this application should not be construed as an admission that such reference is available as prior art to the present disclosure. In addition, any priority document(s) and/or documents related to this application (e.g., co-filed) are hereby incorporated herein by reference in its/their entirety.

Where section headings are used in this document, they should not be interpreted as necessarily limiting.

What is claimed is:

1. A wafer inspection tool including an optical reflective microscope system configured to provide a brightfield channel and a darkfield channel, comprising:
   an illumination system providing ultraviolet illumination light with wavelengths below 300 nm and having:
      a field of view (FOV),
      a light source pupil having a size and shape,
      a central optical axis, and
      one or more field angles defining a shape of said FOV extending away from said light source pupil;
   an objective lens arrangement including an objective and a plurality of interchangeable telescopes coupled thereto, the objective lens arrangement configured to control a magnification and a numerical aperture of said optical reflective microscope, the objective lens arrangement being configured to collect light reflected off a plurality of field points on a wafer and to onwardly transmit a light beam formed from the collected light; and a light separator having and occupying a space between a first reflective surface and a second surface,
wherein the light separator comprises a transmissive region which is transmissive to the illumination light,
wherein said transmissive region is sized, shaped, and positioned to allow therethrough a central portion of said light beam transmitted from said objective lens arrangement corresponding to the brightfield channel, and
wherein said first reflective surface is arranged to reflect a peripheral portion of said light beam transmitted from said objective lens arrangement corresponding to the darkfield channel; and
a relay module configured to relay said light source pupil to said transmissive region,
wherein said transmissive region has a size and shape defined using a geometric intersection volume between a model of said illumination light and said light separator, the transmissive region occupying a portion of a plane of the first reflective surface and a portion of a plane of said second surface, the transmissive region extending as a volume between the first reflective surface and the second surface, the volume defined by transmissive region walls extending between the first reflective surface and the second surface,
wherein the transmissive region enlarges in size between the second surface and the first reflective surface, and
wherein said model includes a plurality of solid shapes, each solid shape having a cross sectional shape of said light source pupil and angled to a field angle of said one or more field angles.

2. The wafer inspection tool according to claim 1, wherein the volume of the transmissive region is enlarged from said geometric intersection volume, wherein the transmissive region walls are positioned outside the geometric intersection volume as defined by the plurality of solid shapes by an enlargement, wherein one or more dimensions of the enlargement are based on one or more tolerances.

3. The wafer inspection tool according to claim 2, wherein said one or more tolerances include an error in positioning of said light source pupil at said transmissive region by said relay module.

4. The wafer inspection tool according to claim 3, wherein said one or more tolerances comprise a relay module magnification error.

5. The wafer inspection tool according to claim 3, wherein said one or more tolerances comprise a relay module centricity error.

6. The wafer inspection tool according to claim 3, wherein said one or more tolerances comprise an error in said size or shape of said light source pupil.

7. The wafer inspection tool according to claim 2, wherein said one or more tolerances comprise one or more errors associated with positioning of said interchangeable telescopes.

8. The wafer inspection tool according to claim 2, wherein said one or more tolerances comprise an error in said one or more field angles.

9. The wafer inspection tool according to claim 2, wherein said one or more tolerances comprise an error in light separator geometry or position.

10. The wafer inspection tool according to claim 2, wherein said one or more tolerances comprise an error in centering of said light separator to said illumination light.

11. The wafer inspection tool according to claim 2, wherein said one or more tolerances comprise an error in relay of said light source pupil associated with aberration in said relay module.

12. The wafer inspection tool according to claim 1, wherein said first reflective surface and the second surface are parallel surfaces.

13. The wafer inspection tool according to claim 1, wherein said transmissive region includes a hole in said light separator.

14. The wafer inspection tool according to claim 1, wherein said transmissive region includes at least partially transparent material.

15. The wafer inspection tool according to claim 1, wherein said illumination system is configured to provide a plurality of illumination FOVs having different light source pupils, and
wherein said light separator comprises a plurality of transmissive regions, each transmissive region corresponding to a light source pupil of a FOV of said plurality of illumination FOVs.

16. The wafer inspection tool according to claim 15, wherein said different light source pupils have different shapes, said plurality of said transmissive regions having corresponding different shapes.

17. The wafer inspection tool according to claim 1, wherein the transmissive region is larger than said geometric intersection volume, wherein the transmissive region walls are positioned outside the geometric intersection volume as defined by the plurality of solid shapes by an enlargement, wherein one or more dimensions in different directions of the enlargement are uniform.

18. The wafer inspection tool according to claim 17, wherein the transmissive region walls are positioned outside the geometric intersection volume by a same dimension for an entire surface of each of the transmissive region walls.

* * * * *